United States Patent [19]

Nattel et al.

[11] Patent Number: 5,595,453
[45] Date of Patent: Jan. 21, 1997

[54] CONSTRUCTION MEMBER PROTECTOR PLATE UNIT

[75] Inventors: William Nattel, Montreal; Serge Michaud, Brossard, both of Canada

[73] Assignee: Thomas & Betts Corporation, Memphis, Tenn.

[21] Appl. No.: 420,954

[22] Filed: Apr. 12, 1995

[30] Foreign Application Priority Data

Apr. 15, 1994 [CA] Canada ............................ 2121451

[51] Int. Cl.⁶ ........................... H02G 3/22; F16L 5/00
[52] U.S. Cl. ..................... 403/252; 403/282; 174/48; 174/136; 52/220.1
[58] Field of Search .................... 174/48, 135, 136; 52/220.1, 220.2, 220.7; 285/183, 188, 200; 403/282, 274, 242, 252

[56] References Cited

U.S. PATENT DOCUMENTS

| | | | |
|---|---|---|---|
| 1,466,361 | 8/1923 | Getchell | 285/188 X |
| 2,273,487 | 2/1942 | Heyman | 174/135 |
| 2,874,980 | 2/1959 | Browning | 285/183 X |
| 2,894,534 | 7/1959 | Kennedy | 285/188 X |
| 3,240,869 | 3/1966 | Jureit . | |
| 4,924,646 | 5/1990 | Marquardt | 174/48 X |
| 5,280,138 | 1/1994 | Preston et al. | 174/136 X |
| 5,488,198 | 1/1996 | Kramer | 174/48 |

FOREIGN PATENT DOCUMENTS 2097969  12/1993  Canada .

OTHER PUBLICATIONS

IBM Technical Disclosure Bulletin, vol. 3, No. 6 Nov. 1960.

*Primary Examiner*—Anthony Knight
*Attorney, Agent, or Firm*—Michael L. Hoelter; Salvatore J. Abbruzzese

[57] ABSTRACT

Metal construction members or studs have a generally U-shaped profile, and can be provided with openings for cables, plumbing conduits and the like. Walls are constructed by attaching wallboard to vertically asserted studs. To protect cables etc. against accidental penetration by nails and screws, a protector plate unit has first and second protector plates for mounting adjacent outer faces of the metal stud. A mounting web extends between the protector plates. Securing means, for example a collar and tabs on the mounting web, engages the opening in the steel stud, to secure the protector plate unit in position, and to provide an internally smooth bushing.

20 Claims, 4 Drawing Sheets

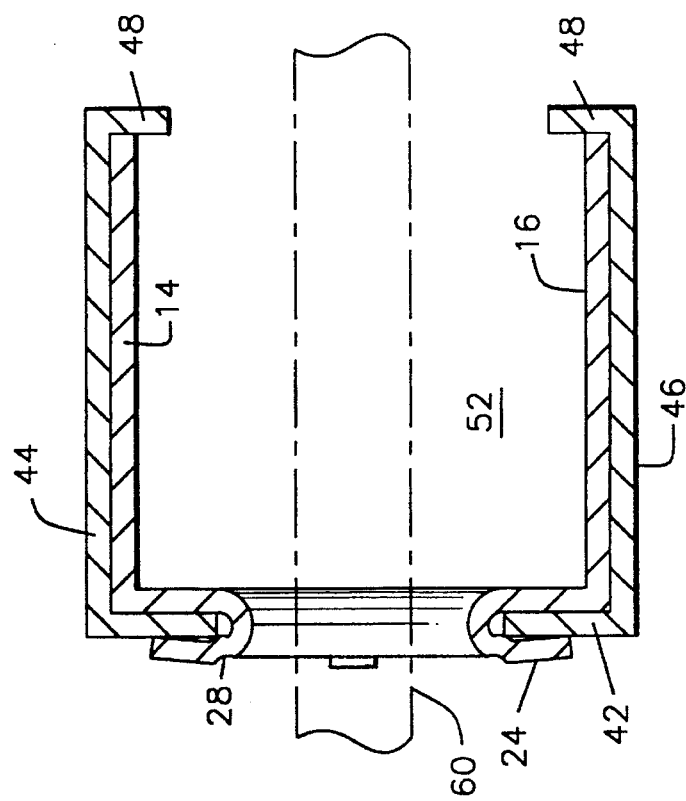
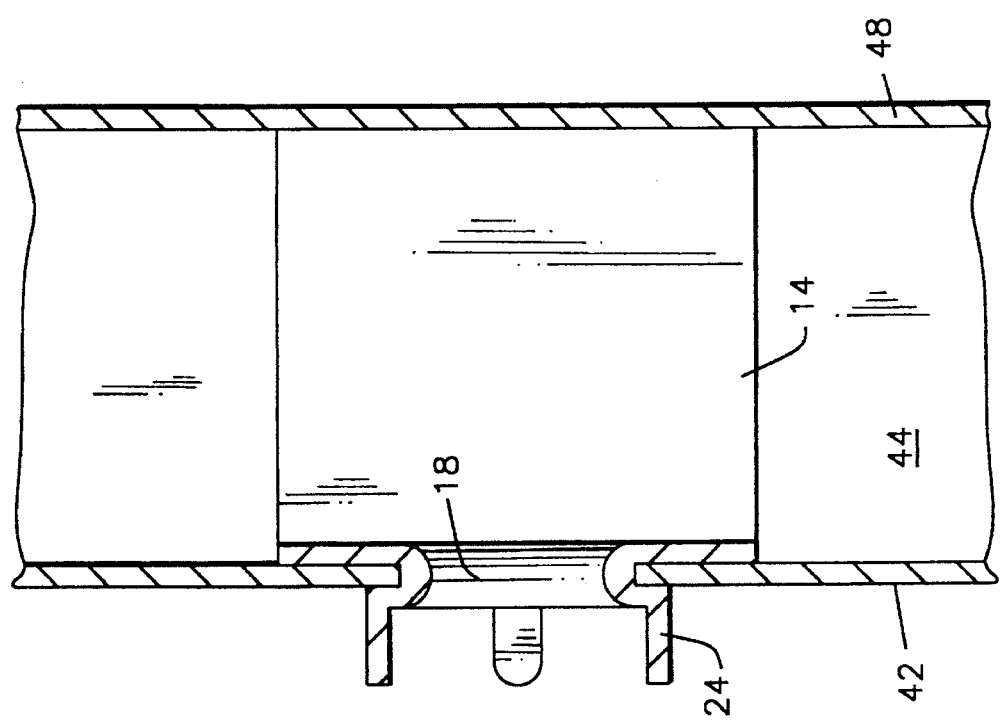

CONSTRUCTION MEMBER PROTECTOR PLATE UNIT

FIELD OF THE INVENTION

This invention relates generally to protector plates for studs or metal construction members used in the construction industry and more particularly to protector plates for protecting electrical cables passing through metal studs.

BACKGROUND OF THE INVENTION

Internal dividing walls in many buildings are commonly constructed from vertical studs or construction members supporting wallboards on either side. It is also usual to provide wiring within the wall, passing through the studs. This construction technique gives rise to safety problems, since it has been found that the cables passing through the studs at a depth close to the attached wallboard can be exposed to accidental penetration by nails, screws or other fasteners driven in through the wallboard into the studs, for mounting the wallboards or otherwise. This has given rise to the development of metal protector plates, applied to the stud face, on either side of the opening through which wiring or piping passes. These metal protector plates have proved effective in preventing the insertion of nails, screws etc. into the studs, and hence preventing them penetrating any wiring or piping.

Previously, the problem was most severe with wooden studs. Protector plates have been developed for use with wooden studs. Such plates were often configured from sheets of metal with nail-like prongs extending therefrom, as disclosed in U.S. Pat. No. 3,240,869.

More recently, the assignee of the present invention has developed a construction stud protector plate, disclosed in published Canadian Patent Application 2,097,969, for use with steel studs. This discloses a metal protector plate, configured for easy and safe attachment to steel studs.

Generally, this provides a metal protector plate adapted to be positioned at the front or back face of a steel stud. At one side, the protector plate has a short side plate, while on the other side it has two bendable tabs. It is intended for the bendable tabs to be bent around a side of the steel stud, while simultaneously forming depressions or deformations to securely retain the protector plate in position. To facilitate this, protuberances are provided, for engagement by a pair of pliers.

Such a construction adequately protects the cabling and prevents penetration by nails, screws etc. However, it has numerous disadvantages. The overall design of the steel plate is relatively complex, for the function it has to serve. Attachment of the plate requires a number of separate operations, namely location on the stud, and two separate bending operations to bend the tabs. Fastening of the steel plate results in deformation of the steel stud. More importantly, each protector plate only protects one side of the stud, so that it is necessary to fasten two separate protector plates, wherever cabling etc. passes through a stud.

Also, it provides no protection to the opening in the stud or beam.

The Canadian Electrical Code now calls for the application of protector plates to all studs, including metal studs, that have electrical cables passing therethrough at a distance less than 1¼ inches from a stud face.

The Canadian Electric Code also specifies that a bushing must be inserted in the hole or opening of the steel stud, where non-metallic sheath cable is to be passed therethrough. Such a bushing is intended to have two purposes, namely to prevent damage to the cable when it is pulled through the stud opening which may have sharp edges, and also to prevent any shape edges cutting into the cable once installed, due to vibration in use.

In any installation, there may be requirements for a cable to pass through numerous studs, requiring a large number of protector plates and protective bushings to be installed. With known devices, for each stud, a separate bushing and two protector plates must be installed.

It is therefore desirable to provide a protector plate design which is capable of quick and easy insertion. Preferably, such a protector plate design provides a protector plate unit which will simultaneously protect both faces of the stud, and provides a bushing for the opening in the stud. More preferably, it should be capable of secure attachment, without requiring any separate deformation or attachment operation.

SUMMARY OF THE INVENTION

In accordance with the present invention, there is provided a protector plate unit, for use with metal construction beams or studs having a side surface and first and second outer faces which extend from the side face and are spaced apart substantially parallel to one another to define an internal cavity, the protector plate unit comprising: first and second protector plates; a mounting portion with the first and second protector plates extending from the mounting portion, spaced apart from one another, and means for securing the protector plate unit to a metal construction beam, with the first and second plates located on either side of the internal cavity.

The protector plate unit could be adapted for the protector plates to be located either internally or externally of the outer faces of the construction beam or stud. Most preferably, the protector plates are located internally and either abut or are generally close to the outer faces.

While the opening in the side face of the beam or stud can have a variety of configurations, it is commonly circular, and formed by a punching operation. Accordingly, it is preferred for the mounting portion to comprise a web portion extending between the protector plates and integral therewith, and also for the securing means to comprise a short cylindrical collar extending from the mounting means, for insertion through a circular opening, together with tabs for securing the unit in position.

Most preferably, the length of the collar and protector plates is greater than the length or depth of the outer faces, so that after fitting, the unit is secure without requiring any separate securing step.

BRIEF DESCRIPTION OF THE DRAWING FIGURES

For a better understanding of the present invention, and to show more clearly how it may be carried out into effect, reference will now be made, by way of example, to the accompanying drawings, which show preferred embodiments of the present invention and in which:

FIG. 3 is a vertical section through a stud and the first embodiment of the protector plate unit;

FIG. 4 is a horizontal section through a steel stud incorporating a first embodiment of a protector plate unit in accordance with the present invention;

DESCRIPTION OF THE PREFERRED EMBODIMENTS

The protector plate unit of the present invention can be used for protecting a variety of conduits, including conventional electric wiring for an A.C. supply, communication cables, plumbing etc. For simplicity, the invention is described in relation to electrical wiring which passes through a steel stud or construction member, as used for supporting wallboard.

Figure 1:
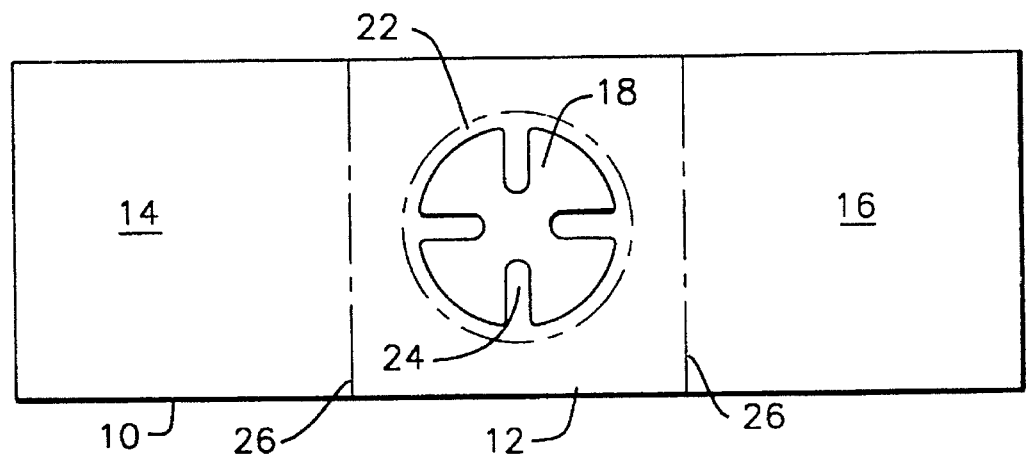
FIG. 1 is a plan view of a blank for forming the protector plate unit.

In the drawings, a protector plate unit is generally indicated by the reference 10. The unit 10 is shown in FIG. 1 in an unformed state. The protector plate unit 10 is formed, in one piece from metal sheet, and is shown in FIG. 1 as stamped from sheet steel.

The unit 10 has a central mounting web 12 which is generally rectangular. The first and second protector plates 14, 16 extend from either side of the web 12, and again are generally rectangular. At the centre of the mounting web 12, an aperture 18 is punched having the profile as shown. Around the aperture 18, as indicated by the dotted line 20, there is an annular portion 22, for forming a collar, as detailed below, extending radially inwardly from its annular portion are tabs 24, whose function is again detailed below.

In production, the blank of FIG. 1 is formed into the protector plate unit, by folding the first and second protector plates 14, 16 along lines 26. The annular portion 23 is punched to form a collar 28 having the profile as shown in FIGS. 3 and 4. Thus, the material of the collar extends, in section, through approximately 180°. Also, the tabs 24 are bent to form the profile shown in FIGS. 2 and 3. Thus, the tabs 24 have their roots extending parallel to the plane of the web 12 and spaced therefrom; the tabs then extend through a right angle and outwardly and perpendicular to the web 12.

The use of the protector plate unit 10 will now be described, in relation to a steel stud indicated generally by the reference 40. The steel stud 40 can be of conventional configuration, and in a dividing wall, a plurality of the studs 40 would be provided between layers of wallboard. The studs 40 are set at standard spacings, as specified by building codes. The studs 40 extend vertically, and are secured at the top and bottom in known manner, typically in channels.

The stud 40 has a side face 42, and first and second, or front and back, outer faces 44, 46. The outer faces 44, 46 continue into side face portions 48, lying in a common plane. Thus, the stud 40 has a generally channel-shaped cross-section and defines an internal cavity 52. The length of the side face 42, which will determine the thickness of a wall, can vary, and typically studs are provided having various standard dimensions for the side 42 in particular. The studs 40 are also commonly provided in standard lengths, and may include certain, standard pre-cut openings. Such an opening can be a circular opening indicated at 50 for electrical wiring or other conduit. Alternatively, the opening 50 can be cut by hand for each individual stud 40. For example, the opening 50 would be cut by hand, either if it is not already cut in the stud, or if the pre-cut openings in that particular stud are insufficient for the wiring, conduit etc. to be accommodated for a particular installation.

Figure 2:
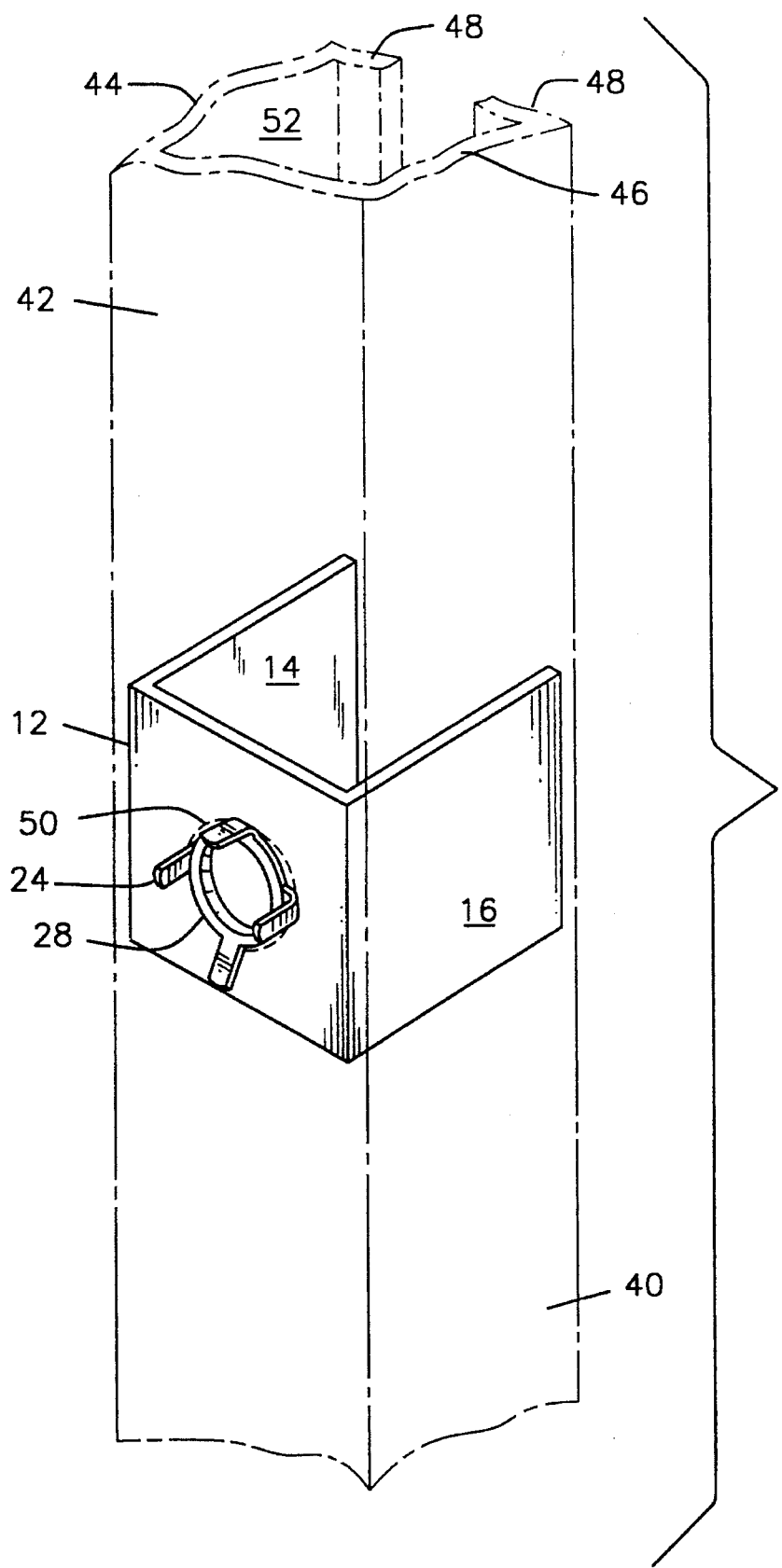
FIG. 2 is a perspective view showing a first embodiment of a protector plate unit and a stud.

As FIG. 2 shows, the opening 50 is located centrally in the web. Such openings are commonly provided at 1 or 1+e,fra 178+ee meter intervals in studs. Pre-cut openings can be relied upon to have been centrally cut. While metal stud punches are available for manual cutting of holes, and some of these are intended to ensure central cutting of an opening, necessarily there is the greater possibility that a hole will be off set at the front or the back. It is thus preferred to use the unit of the present invention in pre-cut openings.

To insert the unit 10, the outer faces 44, 46 are spread apart, to enable the unit 10 to be slid between the side face portions 48. In order to use this insertion procedure, one of the protector plates 14, 16 could be made slightly shorter than the other, but not so short as to impair the protective effect.

As unit 10 is slid between the faces 44, 46, the collar 28 and tabs 24 slide through the opening 50.

The plate unit can then be allowed to slide down slightly, so that the notches formed by the tabs 24 and the collar 28 engage the lip around the opening 50.

For more secure protection, it is preferred to flatten down at least one of the tabs 24, as shown at the bottom of the opening 50. For many purposes, just folding one tab 24 should be sufficient to secure the unit 10 in position, but for full security, all tabs 24 should be folded against the outside of the side face 42 of the stud 40, as shown in FIG. 4.

With the unit 10 in position, the collar 28 provides a rounded surface, which will prevent damage to electrical cable and the like, and enable the cable to be freely pulled through into position, without its external sheath being damaged. The protector plates 14, 16, located on either side of the cavity 52, protect the cable 60, and will prevent screws, nails and other fasteners inserted through the wall board, from passing through the stud 40 and possibly damaging the cable.

Figure 5:
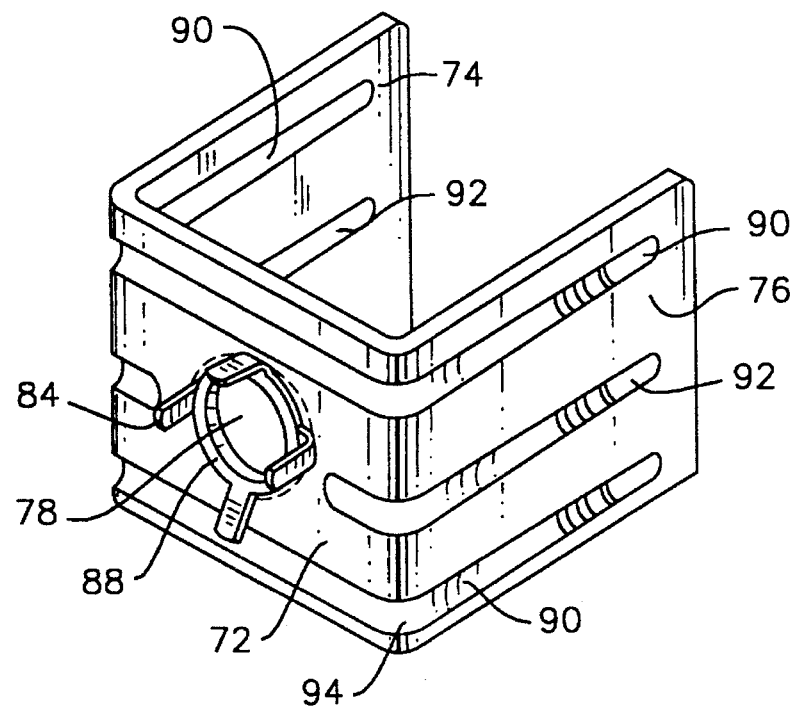
FIG. 5 is a perspective view of a second embodiment of a protector plate unit of the present invention.

Reference will now be made to FIG. 5, which shows a second embodiment of the present invention.

A protector plate unit 70, as before, has a mounting web 72 with first and second protector plates 74, 76. A collar 88 surrounds an aperture 78 and tabs 84 extend from the collar 88. These features correspond to those of the first embodiment, and for simplicity, are not described in detail again.

Here, to reinforce the protector plate unit 70, reinforcing ribs or gussets are provided, by pressing from the sheet material of unit 70. At either end of the unit 70, there is a rib 90 which extends through both protector plates 74, 76 and also the mounting web 72. It can be noted that the ribs 90 pass on either side of the aperture 78. Centrally, two ribs 92 are provided, which terminate at short gussets in the mounting web 72 on either side of the aperture 78, so the aperture 78 is provided in a wholly planar portion of the mounting web 72. As indicated at 94, where the plates 74, 76 meet the mounting web 72, the depths of the ribs 90, 92 can be increased to provide a greater stiffness.

This second embodiment of the protector plate 70 fit and function similarly to the first embodiment 10. It has the advantage of greater stiffness, so that greater loads will be required to cause the protector plates 74, 76 to deflect towards one another. Thus, the ribs 90, 92 serve to support the protector plates 74, 76, in the event that someone attempts to insert a nail or other fastener, which may, if extreme loads are applied, bend the protector plates 74, 76 out of position.

Figure 6:
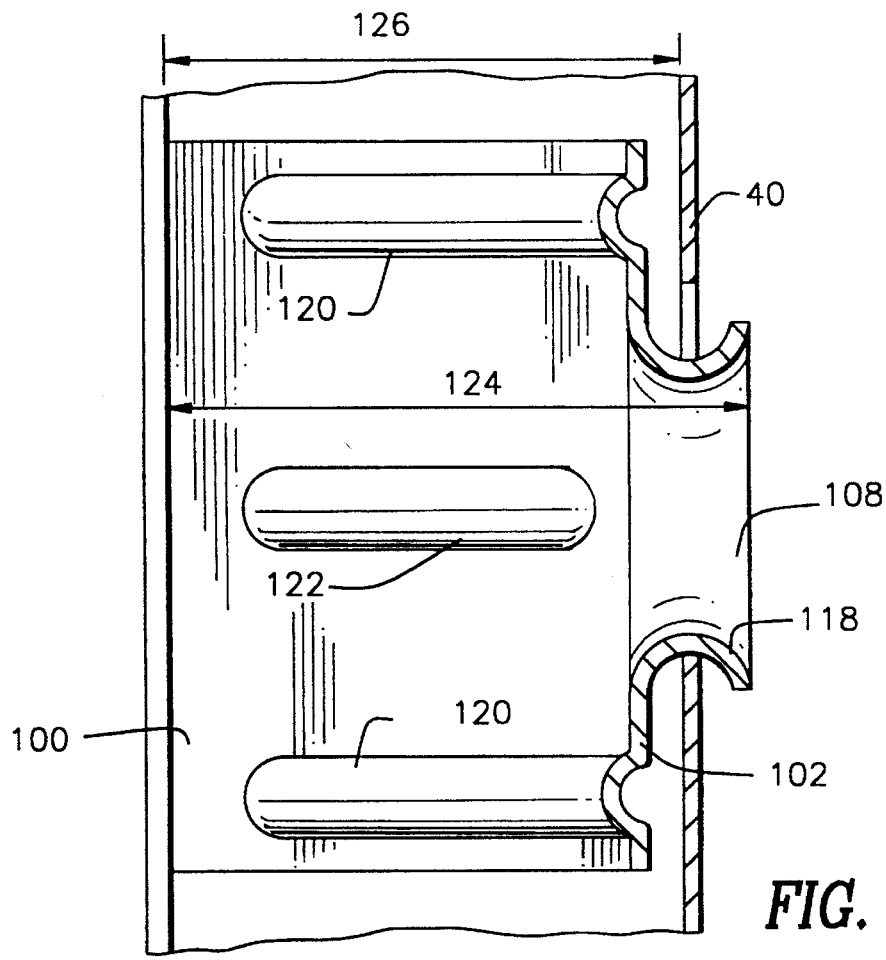
FIG. 6 is a horizontal section through a third embodiment of a protector plate unit according to the present invention and a stud.
Figure 7:
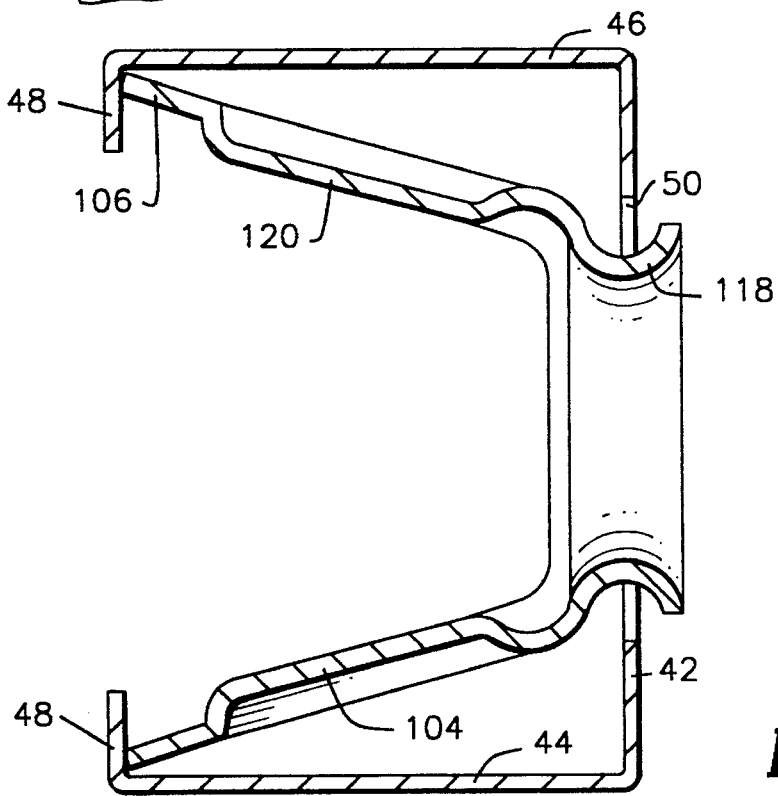
FIG. 7 is a vertical section through the protector plate unit and stud of FIG. 6.

Referring now to FIGS. 6 and 7, the third embodiment of the protector plate unit is designated by the reference 100, and is comparable in many ways to the second embodiment in FIG. 5. Again, the unit 100 has a mounting web 102 and first and second protector plates 104, 106. A collar 118 surrounds an aperture 108, but here there are no tabs, as explained below.

The web 102 is substantially narrower than in the first two embodiments and is generally only slightly wider than the aperture 108. The protector plates 104, 106 extend at obtuse angles from the web 102.

Comparable to the second embodiment, first ribs 120 are provided, extending through the plates 104, 106 and the mounting web 102. Second ribs 122 are provided just in the protector plates 104, and as shown in FIGS. 6 and 7 terminate short of the web 102, so as not to interfere with the mounting collar 118.

The collar 118 has a substantial length along its axis, greater than that shown for the first two embodiments. Consequently, the overall length of the unit 100 indicated by the reference 124 is much greater than the internal depth or width of the stud 40 indicated at 126. In effect, the length of the collar 118 is the difference between these two lengths 124, 126.

This provides a significant advantage during installation and use. The unit is inserted between the outer faces 44, 46 of the stud 40. The width of the unit 100 at the web 102 is less than the spacing between the side face portions 48 and is similar to the outer diameter of the collar 118. Hence, it can be inserted in a wedge-like fashion; this causes the outer faces 44, 46 to be resiliently displaced upon and possibly also for the protector plates 104, 106 to be displaced resiliently together.

In the fully inserted position, the collar 118 is located in the opening 50, as shown in FIG. 6. The outer faces 44, 46 and the protector plates 104, 106 spring back to their usual configurations, again as shown in FIG. 6. The plates 104, 106 are then engaged inside the side face portions 48. Due to the differences in dimensions 124, 126, the collar 118 is prevented from falling out of or withdrawing from the opening 50, so that no further attachment or securement is required. It is not necessary to provide any tabs as-in the earlier embodiments. Even if allowances for tolerances may cause the unit 100 to be slightly loose in the opening 50, it would nonetheless be securely retained in position, and provide both the protector side plates and the smooth bushing for the stud opening.

The length of the collar 118 can be such that it protrudes by at least ¼". This assists in meeting the Canadian Electrical Code requirement that vertical cable runs must be at least ¼" from an adjacent stud.

I claim:

1. A protector plate unit, for use with a metal construction beam comprising:

first and second protector plates, a mounting portion with the first and second protector plates spaced apart from one another and extending from the mounting portion, and means for securing the protector plate unit to the metal construction beam such that the first and second protector plates are located adjacent to opposite sides of an internal cavity of the construction beam.

2. A protector plate unit as claimed in claim 1, wherein the mounting portion comprises a mounting web extending between the first and second protector plates.

3. A protector plate unit as claimed in claim 2, wherein the first and second protector plates and the mounting web are integral with one another, and are formed from sheet material.

4. A protector plate unit as claimed in claim 2, wherein the means for securing the protector plate unit is adapted to engage an opening a side face of the metal construction beam.

5. A protector plate unit as claimed in claim 4, wherein the means for securing the protector plate unit comprises an aperture in the mounting web and an annular collar integrally formed with the mounting web and concentric with the aperture, the collar being engagable with the opening in the side face of the metal construction beam.

6. A protector plate unit as claimed in claim 5, wherein the means for securing the protector plate unit further includes at least one tab with and extending from the collar, the at least one tab being deflectable to a position for securing the protector plate unit relative to the metal construction beam.

7. A protector plate unit for use with a metal construction beam comprising:

a first and second protector plates;

a mounting portion, the first and second protector plates being spaced apart and extending from the mounting portion, wherein the mounting portion forms a mounting web extending between the first and second protector plates, the first and second protector plates located adjacent opposite sides of an internal cavity of the construction beam; and means for securing the protector plate unit to the construction beam, the securing means including an aperture in the mounting web and a collar integrally formed with the mounting web and adapted to engage an opening in a side face of the construction beam the securing means further including tabs integral with and extending from the collar wherein each of the tabs includes a root portion which commences extending parallel to the mounting web and extends through substantially 90°, and a main tab portion extending perpendicularly to the mounting web.

8. A protector plate unit as claimed in claim 5, 6 or 7, which is integrally formed from sheet material, wherein the protector plate unit is adapted to fit within the metal construction beam, and wherein the protector plates extend on one side of the mounting web and the collar extends on the other side of the mounting web.

9. A protector plate unit as claimed in claim 5, 6, or 7 which is integrally formed from sheet material and which is adapted to fit around the exterior of the metal construction beam.

10. A protector plate unit as claimed in claim 5 or 6, which is adapted to fit within the metal construction beam, wherein the collar extends from the mounting web in a direction away from the first and second protector plates.

11. A protector plate unit as claimed in any one claims 1–7, which includes reinforcing ribs extending between the first and second protector plates and through the mounting portion.

12. A protector plate unit as claimed in claim 5, which is integrally formed from sheet material and which includes a pair of first reinforcing ribs, which are parallel to one another, and which extend between the first and second protector plates and through the mounting web, with the reinforcing ribs projecting inwardly of the protector plate unit.

13. A protector plate unit as claimed in claim 12, which includes second, additional reinforcing ribs provided in the first and second protector plates respectively, each additional reinforcing rib extending partially into the mounting web and terminating short of the collar.

14. A protector plate unit as claimed in claim 12 or 13, wherein where the first and second protector plates meet the mounting web, the reinforcing ribs are provided with gussets of increased thickness.

15. A protector plate unit for use with a metal construction beam comprising:

first and second protector plates, the first and second protector plates located adjacent opposite sides of an internal cavity of the construction beam;

mounting web, the first and second protector plates being spaced apart and extending from the mounting web at an obtuse angle to the mounting web and diverging from one another in a direction away from the mounting web; and means for securing the protector plate unit to the metal construction beam, the securing means including an aperture in the mounting web and a collar integrally formed from the mounting web and adapted to engage an opening in the side face of the metal construction beam.

16. A protector plate unit as claimed in claim 15, wherein the width of the mounting web is substantially the same as the outer diameter of the collar.

17. A protector plate unit as claim in claim 16 intended for use with metal construction beam having a side face and first and second outer faces and side face portions extending toward one another from free edges of the first and second outer faces, wherein the length of the protector plate unit from the mounting web to free edges of the protector plates is less than an internal dimension of the metal construction beam between the side face and the side face portions thereof, and wherein the overall length of the protector plate unit from a free end of the collar to the free edges of the protector plates is substantially greater than said internal dimension to ensure that the protector plate unit can be securely retained in an opening in the metal construction beam.

18. A protector plate unit as claimed in claim 15, 16 or 17, which includes reinforcing ribs extending through the first and second protector plates and the mounting web.

19. A protector plate unit as claimed in claim 15, 16 or 17, which includes first ribs on either side of the collar, and second ribs provided generally centrally in the first and second protector plates.

20. A protector plate unit, for use with a metal construction beam comprising:

a mounting portion having a pair of opposed ends;

first and second protector plates extending from each end of the mounting portion, respectively, and being substantially perpendicular to the mounting portion; and means for securing the protector plate unit to the metal construction beam disposed on the mounting portion.

* * * * *